Figure 1:
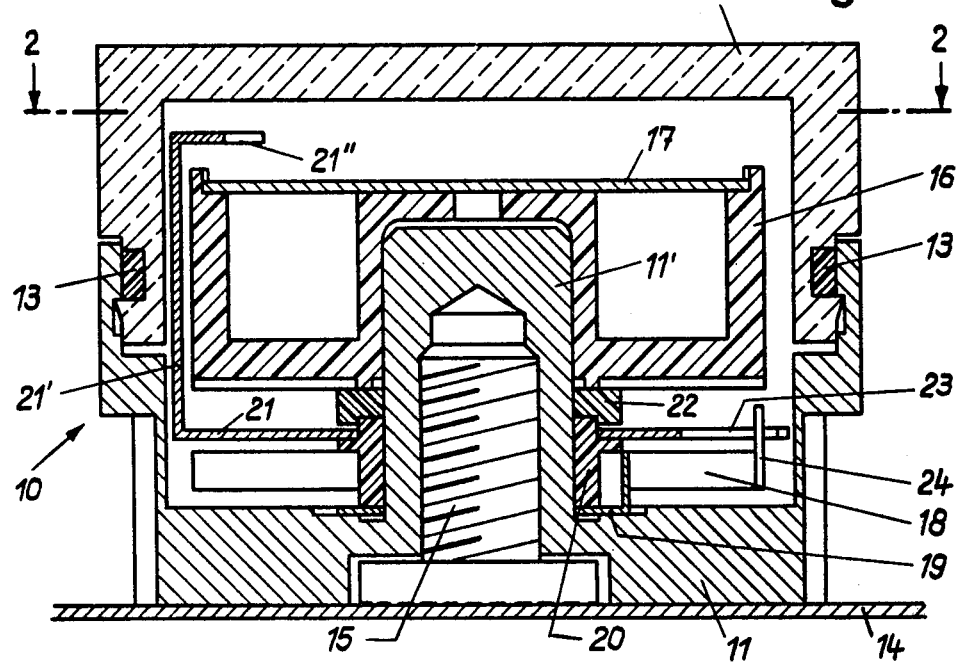

United States Patent [19]

Rüeger

[11] 4,134,299

[45] Jan. 16, 1979

[54] COOKING THERMOMETER

[75] Inventor: Rolf Rüeger, Paudex, Switzerland

[73] Assignee: Rüeger SA, Crissier, Switzerland

[21] Appl. No.: 871,853

[22] Filed: Jan. 24, 1978

[30] Foreign Application Priority Data

Jan. 27, 1977 [CH] Switzerland .................. 1020/77

[51] Int. Cl.² .............................................. G01N 1/16
[52] U.S. Cl. .................................................... 73/362.8
[58] Field of Search .............. 73/362.8, 363.5, 363.7, 73/363.9, 343 R, 343 A; 99/421 TP, 343

[56] References Cited

U.S. PATENT DOCUMENTS

| 2,137,094 | 11/1938 | Nodine .................... | 73/343 R |
| 2,253,263 | 8/1941 | Brown et al. ............. | 73/343 R |
| 2,371,603 | 3/1945 | Bradley .................... | 73/363.7 |
| 3,736,861 | 6/1973 | Kroyer ...................... | 73/343 B |
| 3,851,529 | 12/1974 | Andrews .................. | 73/362.8 |

*Primary Examiner*—S. Clement Swisher
*Attorney, Agent, or Firm*—Stevens, Davis, Miller & Mosher

[57] ABSTRACT

Cooking thermometer with a bimetallic spiral for turning a pointer around a scale marked on a circular dial, comprising a watertight housing with a base and a transparent cover hermetically fitted to the said base, the base being made of a thermally conducting material and being capable of being mounted in a thermally conducting manner on the lid of a cooking vessel, means of fixing the base to the lid of a cooking vessel, and a drum located inside the housing and supporting the dial, said drum being mounted so as to rotate about an axial hub rigidly fixed to the base and being in frictional contact with the hub, such that the position on the drum may be adjusted in order to calibrate the thermometer.

9 Claims, 8 Drawing Figures

U.S. Patent    Jan. 16, 1979    Sheet 1 of 3    4,134,299

COOKING THERMOMETER

The present invention relates to a cooking thermometer with a bimetallic spiral for rotating a pointer about a circular dial marked with a scale.

For the maximum conservation of the dietetic properties and vitamin content of fresh vegetables and meat it is advisable that these foodstuffs be cooked without the addition of water and fat. For this purpose, monitoring of the temperature of the cooking vessel before introducing the foodstuffs and during the cooking time is indispensable. Further, it is particularly important to be able to observe the critical temperature at which the heat supply must be cut back to a minimum after the warming-up period.

Cooking thermometers of the prior art either protrude into the interior of the cooking vessel, or are simply laid upon the lid of the said vessel in order to measure its surface temperature. For thermometers which protrude into the interior of the vessel the lid must be provided with a suitable aperture, and the thermometer requires to be cleaned each time it is used. The second alternative, namely that of simply laying the thermometer on the lid of the vessel, gives inaccurate results. There is also a risk of damaging the thermometer.

The object of the present invention is to overcome these drawbacks and ensure reliable monitoring of the temperature. The thermometer according to the invention is characterised by a watertight housing with a base and a transparent cover no rigidly fixed to the said base, the base being made of a heat-conducting material and capable of being fitted in a heat-conducting manner to the lid of a cooking vessel, by means of fixing the base to the lid of a cooking vessel, and by a drum located inside the housing and protecting the dial, the said drum being mounted on a hub rigidly fixed in an axial direction with respect to the base such that it may be rotated about the said hub and is in fricional contact with it, so that the drum may be adjusted in order to calibrate the thermometer.

Figure 2:
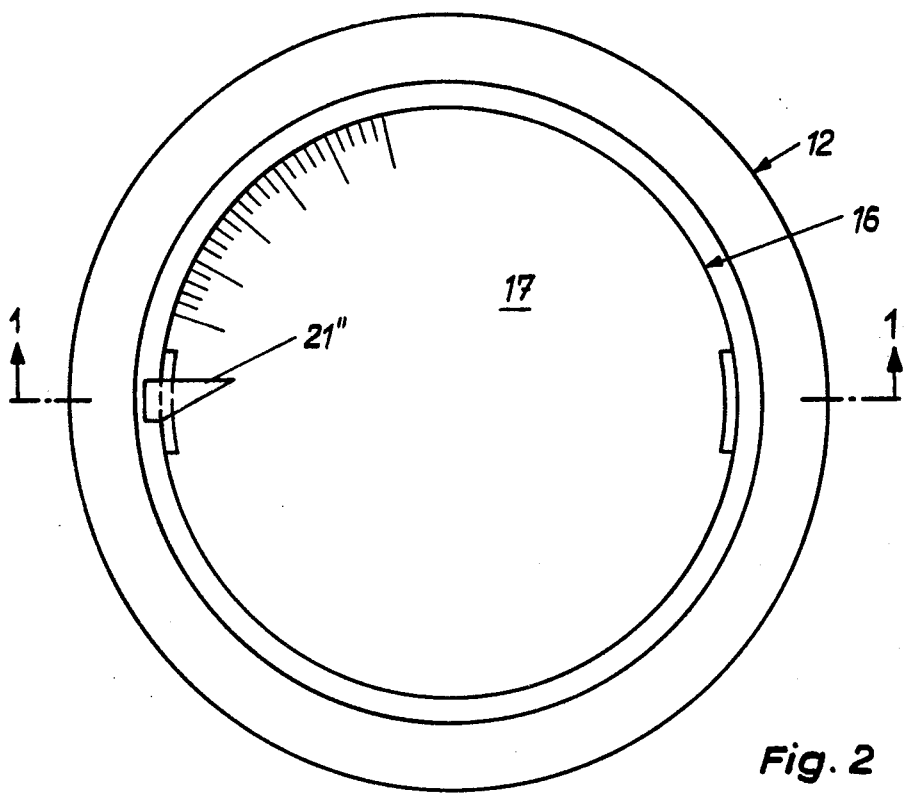
Figure 3:
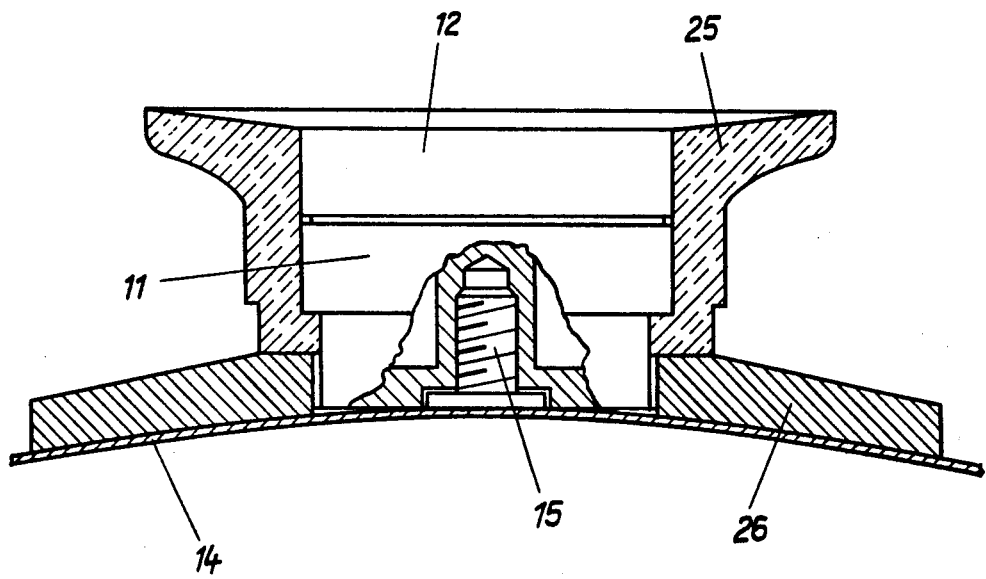
Figure 4:
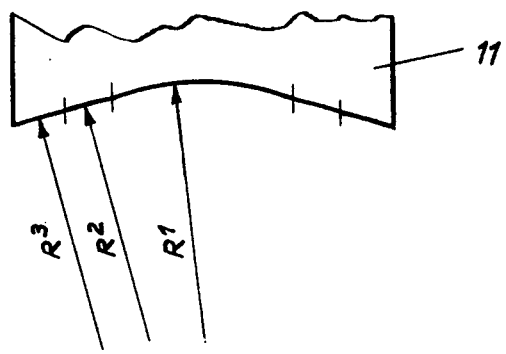
Figure 5:
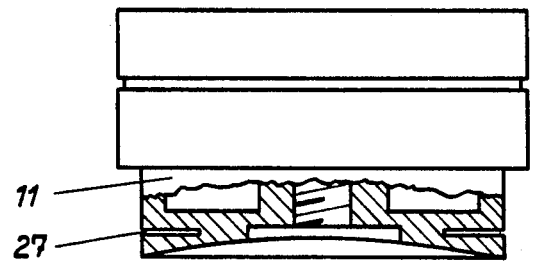
Figure 6:
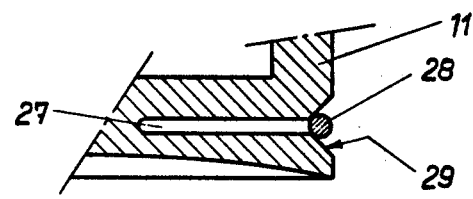

An embodiment of a thermometer according to the invention is illustrated in the attached drawings by way of example. The drawings show:

FIG. 1: a cross-section along the line 1—1 of FIG. 2;
FIG. 2: a plan view of the thermometer;
FIG. 3: a partial sectional view on a smaller scale of a thermometer mounted in the knob on the lid of a cooking vessel;
FIG. 4: a schematic illustration of the geometrical shape of the base;
FIG. 5: a partial sectional view of a thermometer whose base has a different geometrical shape from that shown in FIG. 4;
FIG. 6: a detail enlargement of the thermometer illustrated in FIG. 5, and
FIGS. 7 and 8: sketches of two further embodiments similar to that shown in FIG. 5.

The cooking thermometer shown in FIG. 1 comprises a watertight housing 10, consisting of a base 11 made of a material with good thermal conductivity, such as a light alloy, and a cover 12 of transparent material, the said cover being a notch fit into the base 11. A ring-shaped seal 13 is located between the parts 11 and 12 to ensure the watertightness of the complete thermometer. Once it is fitted, the thermometer cannot be removed. The base 11 is intended to remain in contact with the lid 14 of a cooking vessel or other container, not shown in the drawing, serving for the preparation of foodstuffs, such as vegetables, meat, etc. For this purpose the base 11 carrries an axial hub 11' containing a tapped hole. The said tapped hole serves to accomodate a screw 15 which is fixed to the lid 14 by electrical spot-welding.

The housing 10 contains a drum 16 carrying a dial 17 marked with a scale which may be graduated either with marks and figures or divided into zones of different colours depending on the nature of the foodstuffs being cooked. For the purpose of calibrating the thermometer, the drum 16 may be rotated about the hub 11'.

A bimetallic spiral 18 is attached to the foot of the hub 11' by means of a holder 19 made of a suitably bent piece of sheet metal embedded in the base 11. A sleeve 20 made of a material with a low coefficient of friction is a close fit over the hub 11' and is located above the holder 19. A sheet-metal pointer 21 is rotatably mounted between a shoulder of the sleeve 20 and a ring 22, the said ring 22 also being made of a material with a low coefficient of friction and being a close fit over the hub 11'. An angled arm 21' of the part 21 is bent over at its upper end to form the pointer 21", located above the dial 17. The other end of the pointer 21 is pierced by a slot 23 into which fits a pin 24 fixed to the bimetallic spiral 18.

The thermometer shown in FIG. 3 is located inside a plastic handle 25. A metal disk 26 is placed between the handle 25 and the lid 14 of the cooking vessel. There is an aperture in the top of the handle 25 so as to render visible from above the pransparent cover 12 of the housing 10, and hence the dial 17 and the pointer 21".

The bottom surface of the base may be machined to fit any desired form of lid.

In particular, the bottom surface of the base may be machined to the form illustrated in FIG. 4. This ensures that there always a maximum area of contact surface between the base 11 and the lid 14. A further advantage is that it is possible to dispense with the use of an intermediate piece. In order to show more clearly the shape of the surface, the curvatures associated with the radii $R_1$, $R_2$ and $R_3$ have been drawn in an exaggerated form in FIG. 4. These three radii, whose number is by no means limited to three, are concentric and correspond to the curvatures of three different lids. This shape ensures that an annular portion of the bottom surface of the base with a definite width will always be in contact with the surface whose temperature it is desired to measure.

In the embodiment of the invention illustrated in FIGS. 5 and 6, a circular groove 27 has been cut in the base 11 in the vicinity of its bottom surface. The said groove is held open by means of a spring 28 running round the circumference of the base 11 and fitting in a chamfer 29 with suitably dimensioned flanks. The chamfer 29 is located at the open end of the cross-section of the groove. This arrangement enables the bottom surface of the base to be adapted to a lid (not shown in the drawing) without the necessity of machining various curvatures in the said bottom surface during manufacture.

Figure 7:
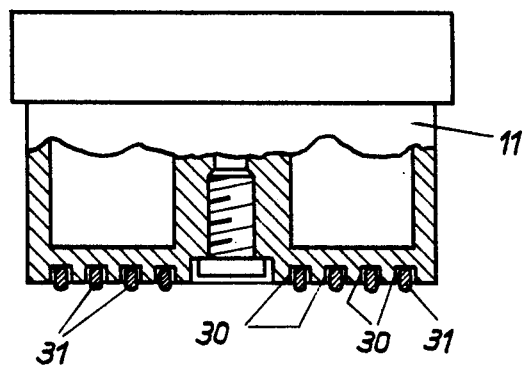

FIG. 7 illustrates another embodiment of the bottom surface of the base 11. Concentric circular grooves 30 are cut in this surface. The said grooves 30 serve to accomodate rings 31 made of an elastic material with good thermal conductivity. For this purpose it is possible to use, for example, aluminium wire. The elastic rings thus formed adapt themselves to the upper surface of the lid, thus creating a good contact and ensuring perfect heat transfer from the lid of the cooking vessel to the base of the thermometer.

Figure 8:
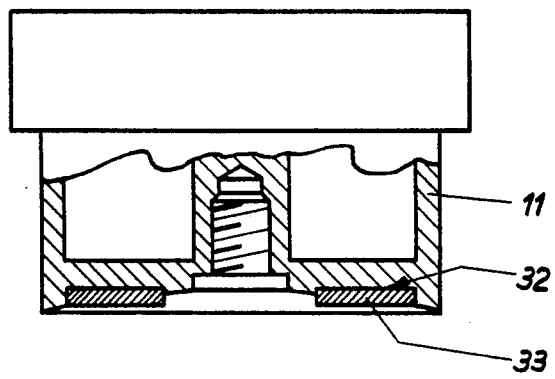

In the embodiment of the invention shown in FIG. 8, an annular depression 32 is machined in the bottom surface of the base 11 to accomodate an annular disk 33. The said disk 33 is made of an elastic material and, like the rings used in the embodiment of the invention illustrated in FIG. 7 has a good thermal conductivity.

An advantage of the cooking thermometer according to the invention is that it can be built into the knob-shaped handle and lid of the cooking vessel or other container. This arrangement enables the cooking temperature of the foodstuffs in the container to be read off directly from the said knob-shaped handle of the lid.

A further advantage of the cooking thermometer according to the invention is that the lid on which it is mounted is easy to clean, since its inner surface is smooth without any protuberances. Since the thermometer fixed to the other side of the lid is watertight, the lid of the vessel can be washed in water without any difficulties.

I claim:

1. Cooking thermometer with a bimetallic spiral for turning a pointer around a scale marked on a circular dial, characterized by a watertight housing with a base and a transparent cover hermetically fitted to the said base, the base being made of a thermally conducting material and being capable of being mounted in a thermally conducting manner on the lid of a cooking vessel, by the means of fixing the base to the lid of a cooking vessel, and by a drum located inside the housing and supporting the dial, the said drum being mounted so as to rotate about an axial hub rigidly fixed to the base and being in frictional contact with the said hub, such that the position of the drum may be adjusted in order to calibrate the thermometer.

2. Thermometer in accordance with claim 1, characterised in that the cover is transparent and attached to the base by means of a notch such that it cannot be removed, and in that a ring-shaped seal is located between the cover and the base.

3. Thermometer in accordance with claim 1, characterised in that the axial hub is integral with the base, and in that there is a tapped blind hole inside the hub serving to accomodate a screw preferably fixed by welding to the lid of the cooking vessel.

4. Thermometer in accordance with claim 3, characterised in that one end of the bimetallic spiral is fixed to a piece of bent sheet metal embedded in the base around the hub, the other end of the bimetallic spiral carrying a pin engaging in a slot cut in the pointer rotating about the hub.

5. Thermometer in accordance with claim 1, characterised in that it is embedded in a plastic handle open at its upper end in order to render visible the dial through the transparent cover.

6. Thermometer in accordance with claim 1, characterised in that the bottom surface of the base comprises concentric areas with various curvatures to enable it to be fitted to lids with various curvatures.

7. Thermometer in accordance with claim 1, characterised in that a circular groove is cut in the base in the vicinity of its bottom surface, the said groove opening out at the periphery of the base in the form of a chamfer with suitably dimensioned flanks to accomodate a spring serving to adapt the bottom surface on the base to lids of different curvatures by elastic means.

8. Thermometer in accordance with claim 1, characterised in that concentric grooves are cut in the bottom surface of the base in order to accomodate elastic rings of a material with a good thermal conductivity, such as aluminium, the said rings adapting themselves to the shape of the lid on which the base is mounted.

9. Thermometer in accordance with claim 1, characterised in that an annular depression is machined in the bottom surface of the base to accomodate an annular disk of elastic material with good thermal conductivity, such as aluminum, the said annular disk adapting itself to the shape of the lid on which the base is mounted.

* * * * *